Dec. 21, 1954  C. F. RICHARD  2,697,533
PACKAGE LABELING MECHANISM
Filed July 25, 1952  7 Sheets-Sheet 1

Charles F. Richard, Inventor
By Emil Kinhart
Attorney.

Dec. 21, 1954  C. F. RICHARD  2,697,533
PACKAGE LABELING MECHANISM
Filed July 25, 1952  7 Sheets-Sheet 2
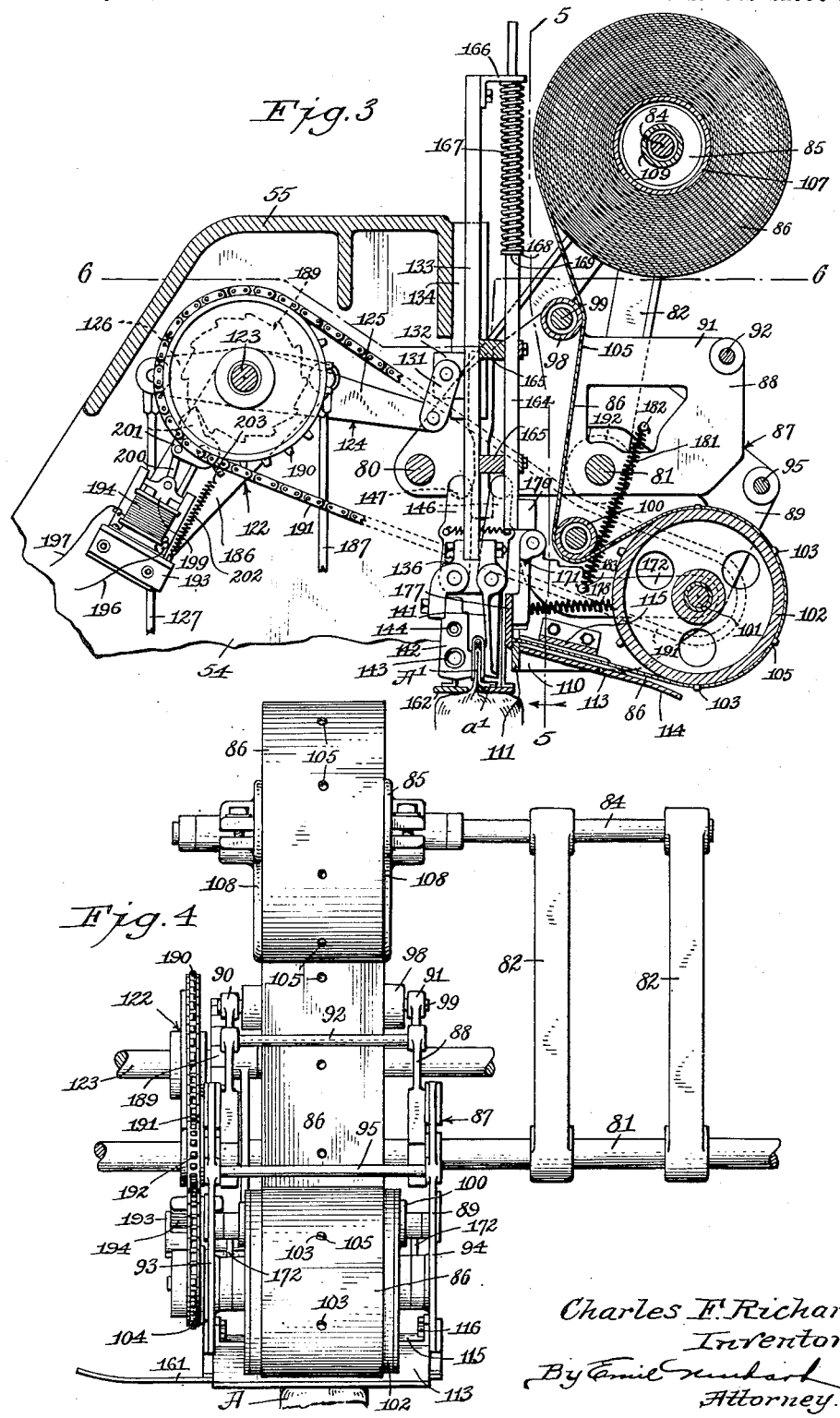
Charles F. Richard
Inventor
By Emil Gunhart
Attorney.

Dec. 21, 1954  C. F. RICHARD  2,697,533
PACKAGE LABELING MECHANISM
Filed July 25, 1952  7 Sheets-Sheet 3
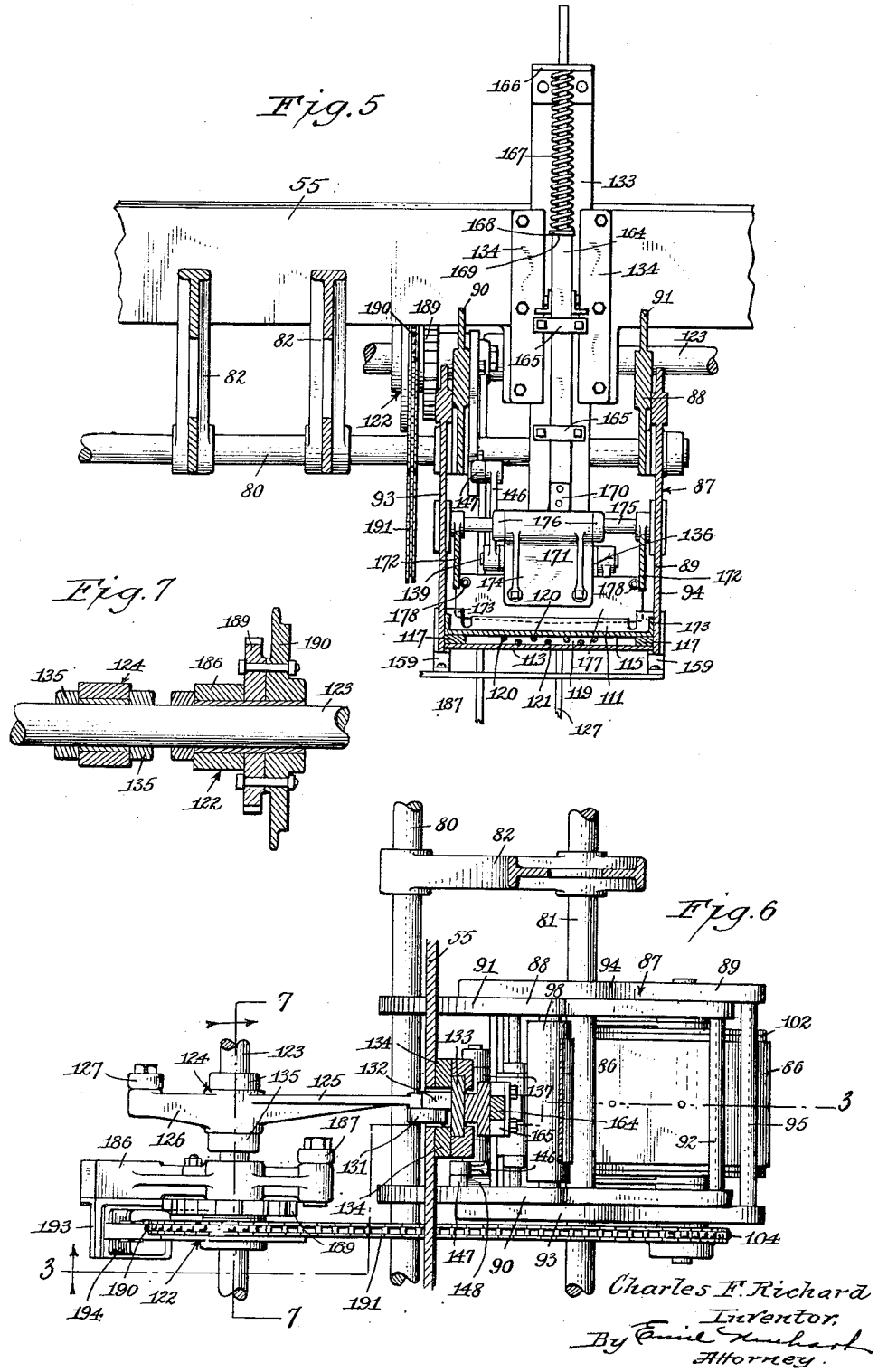

Dec. 21, 1954 C. F. RICHARD 2,697,533
PACKAGE LABELING MECHANISM
Filed July 25, 1952 7 Sheets-Sheet 4
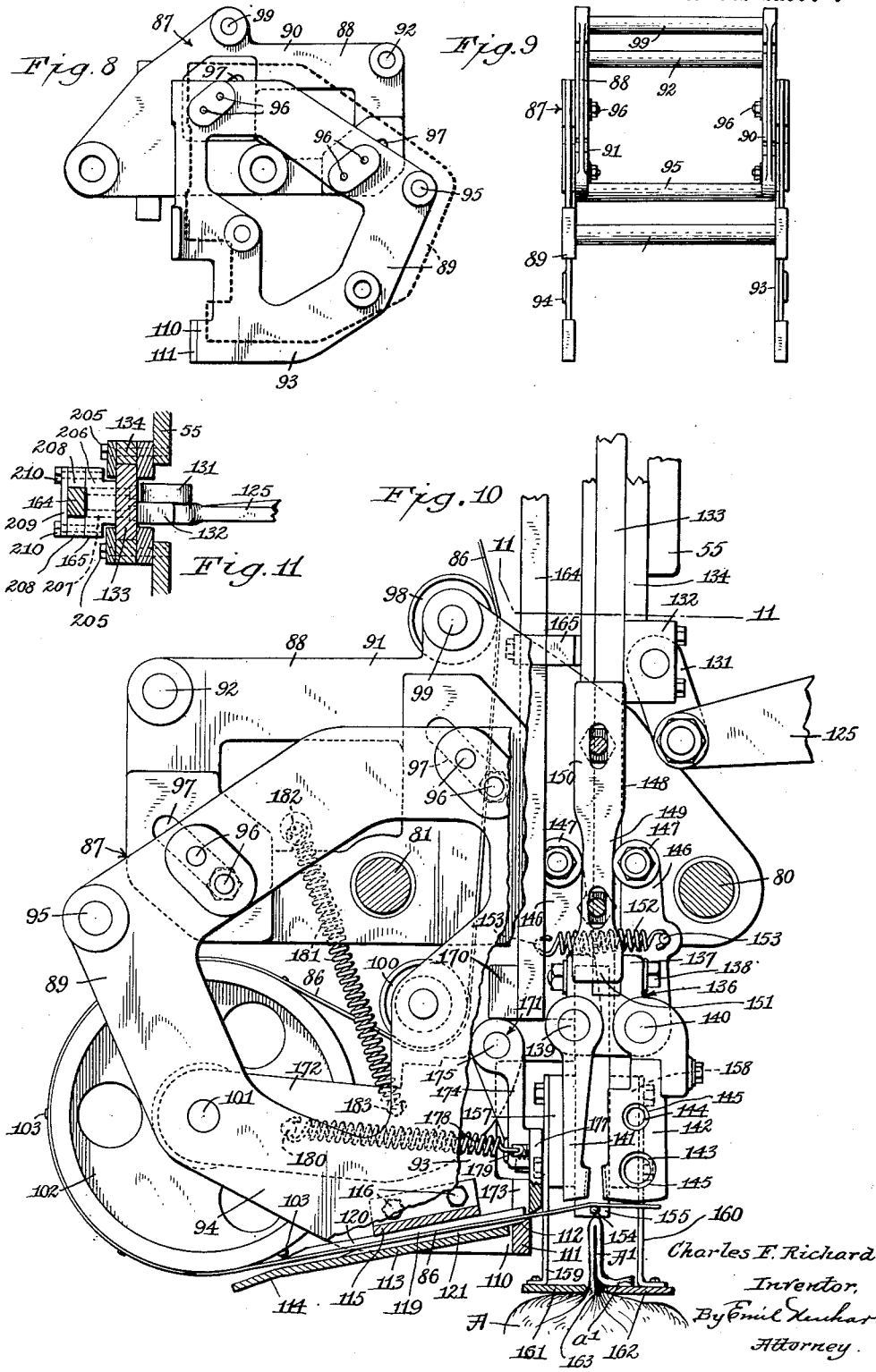

Dec. 21, 1954 C. F. RICHARD 2,697,533
PACKAGE LABELING MECHANISM
Filed July 25, 1952 7 Sheets-Sheet 5
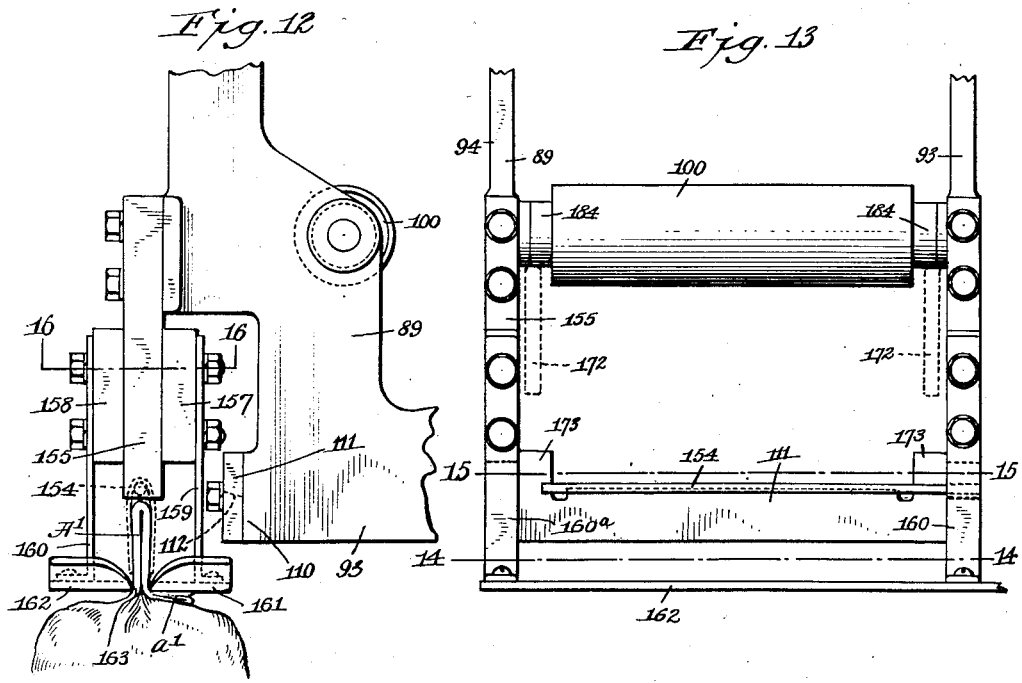
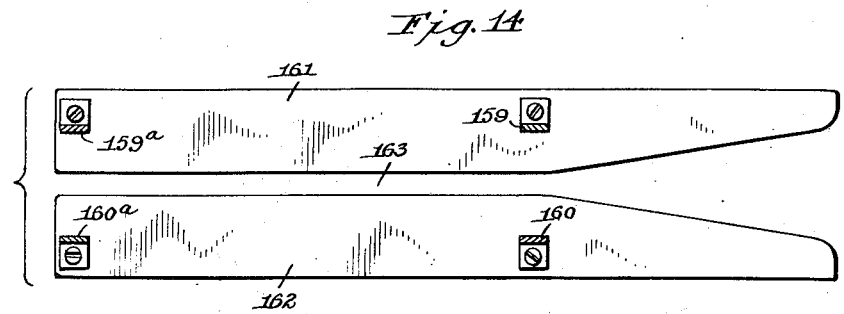
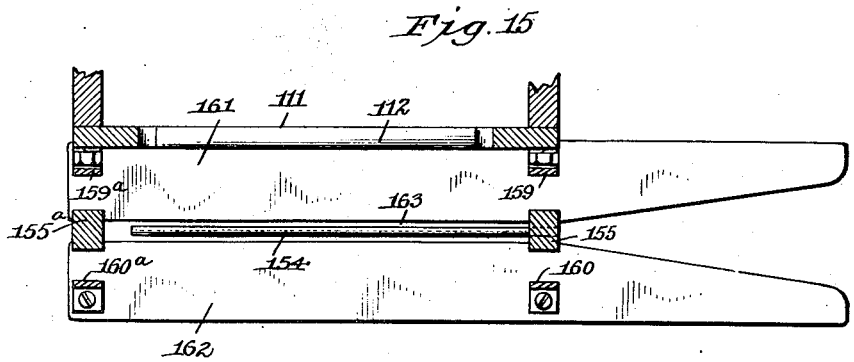
Charles F. Richard, Inventor
By Emil Neuhart
Attorney.

Dec. 21, 1954
C. F. RICHARD
2,697,533
PACKAGE LABELING MECHANISM
Filed July 25, 1952
7 Sheets-Sheet 6
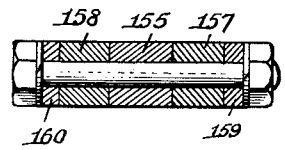
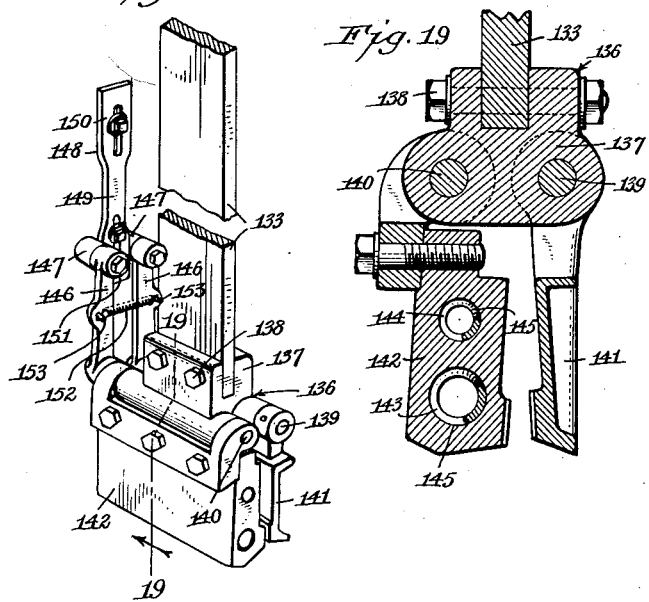
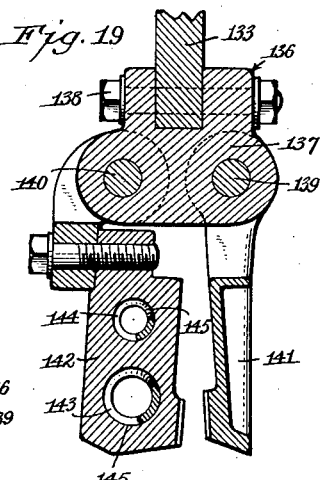
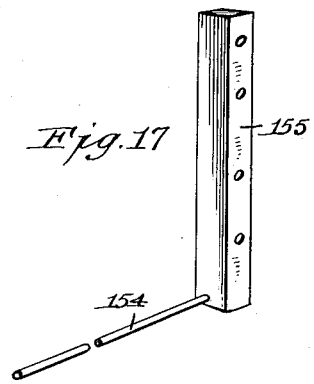
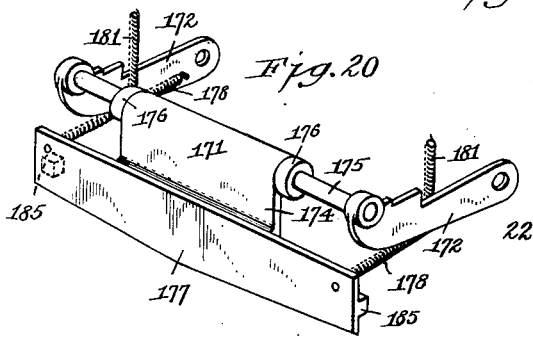
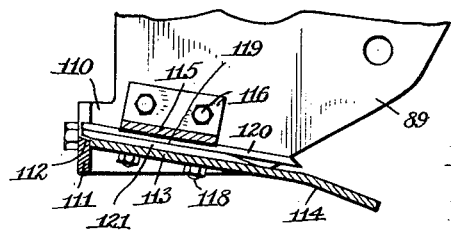
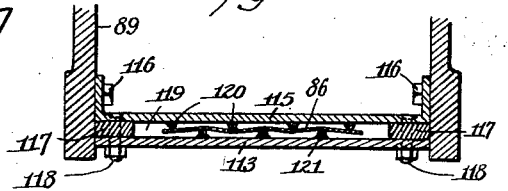
Charles F. Richard, Inventor
By Emil Kemhart
Attorney.

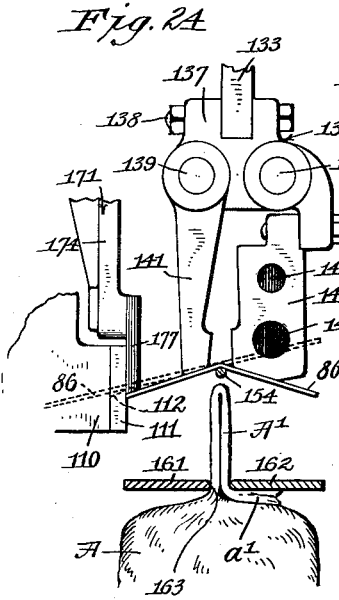

United States Patent Office 2,697,533
Patented Dec. 21, 1954

2,697,533

PACKAGE LABELING MECHANISM

Charles F. Richard, Williamsville, N. Y.

Application July 25, 1952, Serial No. 300,843

25 Claims. (Cl. 216—28)

My invention relates to a package labeling mechanism and more particularly to a machine for applying labels to bags provided at their upper ends with upstanding folds formed by hand, or mechanically, after the bags are partially filled preparatory to being closed by crimping and folding the free upper ends to form such upstanding folds.

Closing bags by means of such folds are commonly resorted to and such bags are, in most cases, constructed of paper or other flexible material sealable under heat.

Candy, beans and the like, cereals of various kinds and other goods are packaged in bags by partly filling the same so that the upper portions of their walls are free and permit opposite wall portions to be crimped or folded inwardly from opposite sides, after which the remaining upper wall portions are brought together and folded so as to form an upstanding fold with a free laterally extending flap, in the manner set out in my co-pending application for Patent Serial No. 130,620, filed December 2, 1949, now Patent No. 2,641,882, issued June 16, 1953.

Bags so closed may be left unsealed to be labeled in accordance with this invention or they may be sealed by means of the mechanism of my said co-pending application, or otherwise, and labeled according to this invention.

I have illustrated this invention in association with parts of my co-pending application to show the manner of feeding the so closed bags to my improved labeling mechanism and to control the labeling of the bags so that the labeling mechanism ceases to function when the regulated feeding of the bags through the packaging machine illustrated in my aforesaid co-pending application is interrupted.

The primary object of this invention is to mechanically apply a label over the upstanding fold of a closed bag containing goods or wares of any kind capable of being packaged and attach the label thereto.

Another object is to apply a folded label over the upstanding fold of a closed bag and secure the label thereto by means of heat, the label preferably having a thermoplastic coating assuring adherence thereof to the upstanding fold formed by closing the upper end of the bag over its contents.

Another object is to provide a roll of labeling material having a thermo-plastic coating or being otherwise sealable under heat and to intermittently feed the rolled material to a cutting device adjacent a labeling station for severing a portion of the labeling material to a size capable of being folded over and in contact with both sides of an upstanding fold on the bag, and in applying heat to the folded labeling material after it is brought in contact with said upstanding fold.

Still another object is to crimp the labeling material preparatory to severing a fold portion so that it will be delivered in a freely foldable condition to the upstanding fold of the bag.

Still another object is to employ combined heating and folding elements for the purpose of both folding the labeling material and causing adherence of the latter to the flap of a bag under heat applied by said elements.

Further objects of my invention, all important for the purpose for which this invention is designed, will appear in the descriptive matter to follow.

In the drawings:

Fig. 3 is a vertical section through my improved bag-labeling and sealing mechanism or device; the same being taken on or about line 3—3, Fig. 6, and looking in the direction of the arrow crossing said line.

Fig. 4 is a front elevation of the improved labeling mechanism or device.

Fig. 5 is a section taken on or about line 5—5, Fig. 3, looking in the direction of the arrow crossing said line.

Fig. 6 is a section taken on or about line 6—6, Fig. 3.

Fig. 7 is a section taken on line 7—7, Fig. 6, looking in the direction of the arrow crossing said line.

Fig. 8 is a side elevation of the two-part frame of the labeling device, per se.

Fig. 9 is an end view of said frame, looking toward the right in Fig. 8.

Fig. 10 is a sectional side elevation of the labeling mechanism on a scale somewhat enlarged from the previous figures.

Figure 11 is a section taken on line 11—11, Fig. 10.

Fig. 12 is a side elevation of a portion of the frame showing the means for supporting the pair of guide strips between which the upstanding fold of a closed bag is adapted to pass, the strips having one of their ends broken away.

Fig. 13 is a rear view of the parts of the mechanism or device shown in Fig. 12.

Fig. 14 is a horizontal section taken on line 14—14, Fig. 12 showing the complete length of the guide strips.

Fig. 15 is a horizontal section taken on line 15—15, Fig. 13.

Fig. 16 is an enlarged section taken on line 16—16, Fig. 12.

Fig. 17 is a detached perspective view of the folding element or wire and its support, over which the piece of flexible labeling material is adapted to be passed and folded to lie on opposite sides of the upstanding fold of a closed bag.

Fig. 18 is a broken detached perspective view of the parts of the labeling mechanism which include the label-folding and sealing device, the slide member carrying the same and the means employed for swinging the folding and labeling elements of said device toward and from each other.

Fig. 19 is an enlarged vertical section taken on or about line 19—19, Fig. 18, looking in the direction of the arrow crossing said line and omitting the trip levers and cam element shown in Fig. 18.

Fig. 20 is a detached perspective view of the cutter element and the pivoted frame member carrying the same.

Fig. 21 is a sectional plan view showing the guide for the flexible labeling element and the means combined therewith for crimping the same preparatory to said labeling element being fed over the folding element or wire serving as a means to form the fold for directing the flexible labeling element to opposite sides of an upstanding fold on the closed bag.

Fig. 22 is a sectional view taken on line 22—22, Fig. 21, looking in the direction of the arrow crossing said line.

Fig. 23 is a sectional view taken on line 23—23, Fig. 21, looking in the direction of the arrow crossing said line.

Figure 1:
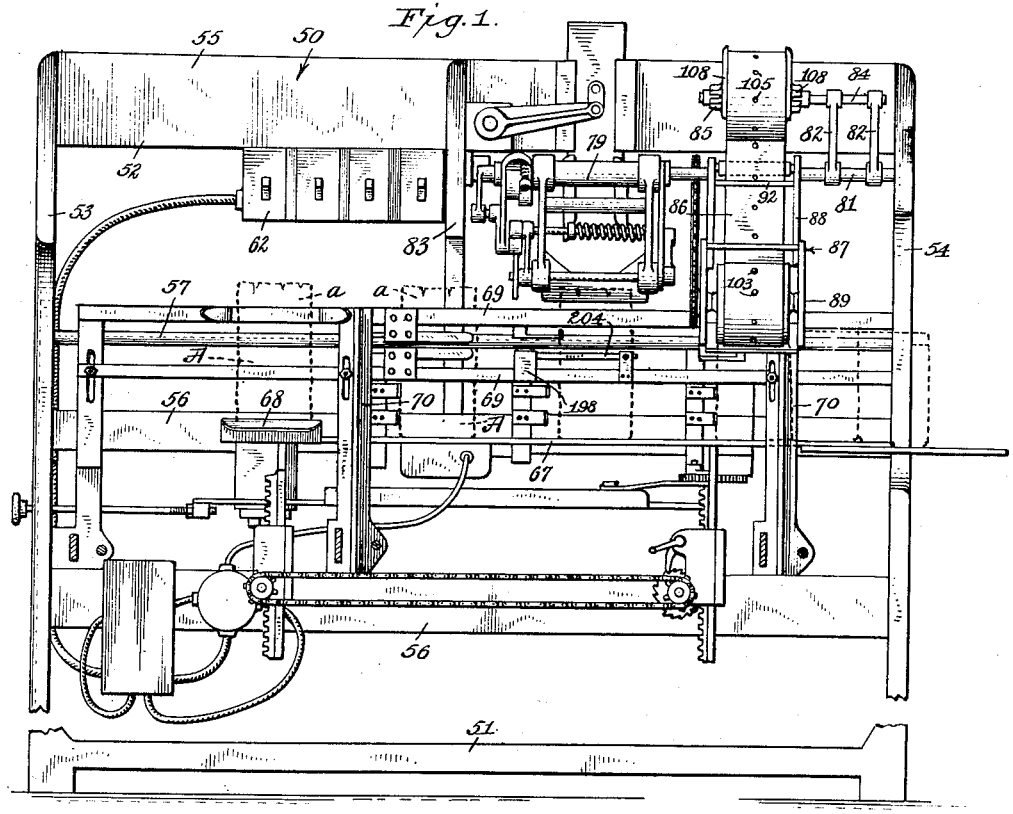
Fig. 1 is a broken front elevation of a bag-packaging machine in which my improved labeling mechanism or device is included to illustrate the continuity of the bag-closing, sealing and labeling operation when such operation is considered desirable.

Fig. 24 is a detailed view of the folding and crimping device in association with the cutting or severing device and the guide strips between which the upstanding fold of a closed bag is passed, and showing also a section of the folding element or wire, all in association with a piece of flexible labeling material severed from a strip of material to be folded down against opposite sides of the upstanding fold of a closed bag and sealed thereto.

Fig. 25 is a similar view showing the severed piece of flexible labeling material partly folded over the upstanding fold of a closed bag.

Fig. 26 is a similar view showing the flexible labeling material folded and forced against opposite sides of the upstanding fold of a closed bag and in the act of being sealed against the fold by means of heat applied thereto contained within the folding elements.

Fig. 27 is a plan view of a strip of labeling material from which a definite length or piece is severed with each cycle of operation of the labeling mechanism.

Fig. 28 is a view of the piece of flexible labeling material severed from the strip preparatory to applying it to the upstanding fold of a closed bag.

Fig. 29 is a diagrammatic view of the electric circuit employed with my improved labeling mechanism when associated with a bag-packaging machine so as to synchronize the cutting and label-applying operation with the feeding of bags through the bag-packaging machine.

Fig. 30 is a side elevation of a partially filled bag open at its upper end in the manner it is to be delivered into the bag-packaging machine preparatory to closing the same and forming an upstanding fold thereon.

Fig. 31 is a top plan view of the bag as shown in Fig. 30.

Having reference to the drawings in detail, 50 designates the frame of a packaging or bag-closing machine of the type shown in my aforesaid co-pending application, which frame comprises a base member 51 and a superstructure 52 mounted on the base member and secured thereto in any approved manner.

The superstructure of the frame comprises end members 53, 54 connected at the top by a longitudinal frame member 55 and by a longitudinal connector member or members, such as shown at 56, disposed between the base member and the longitudinal frame member 55. A tie-rod 57, which serves as a guide rod, also ties the end members 53 and 54 together.

58 is a table frame member which has opposite ends fastened to the end members 53, 54; it being disposed along the rear of the machine and having the primary actuating mechanism 59 of the machine mounted thereon. On this table frame member, or longitudinally disposed platform as it may be termed, a variable speed motor 60 and reduction gear mechanism within a reduction gear casing 61 are mounted and these serve to drive the primary actuating mechanism at the desired speed.

An electric switch of any approved construction, indicated at 62, is supported by the longitudinal frame member 55 and current-conducting wires passing from said switch to the motor in any suitable manner serve as a means to operate said motor; it being understood that main-line wires lead to said switch.

Secured to a shaft journaled in suitable bearings rising from the table frame member or platform 58 and having operative connection with the reduction gear mechanism in the reduction gear casing 61, are cams 63, 64, 65 and 66 which are adapted, through the medium of intervening mechanical parts, to operate bag or package feeding mechanism, and control and actuate bag-folding mechanism in the manner described in my said co-pending application, and also to actuate my improved labeling mechanism, as will be explained hereinafter.

A bag or package supporting rail or track 67 is arranged lengthwise of the machine and extends from a point spaced from the end frame member 53 to the end frame member 54; it being secured rigidly in place in any suitable manner.

Extending forwardly from the end of the supporting rail or track spaced from the end frame member 53 is a bag-receiving table or platform 68 onto which partially filled bags A to be closed are placed and labels are to be attached. The bags are preferably constructed of cellophane or any other material which, when two layers thereof are brought together and subjected to heat, adhere to each other. It is however to be understood that heating of the bags may be dispensed with and they may be retained in closed condition by other means under action of my improved labeling mechanism.

The bags A which are open at the top may, prior to placing the same on the platform 68 or after being so placed, be filled to within a short distance from the top and when so partially filled, the upper portions a of the four sides thereof extend upwardly in substantially flat and free condition so that the bag is fully open.

The partially filled bags are manually pushed from the bag-receiving table or platform 68 onto the supporting rail or track 67 with the inner side of the bag in contact with longitudinally-disposed straight-lined guide rails 69, arranged one above the other and fastened to uprights or brackets 70 carried by the frame in any suitable manner.

Uprights or brackets 71 disposed in a plane in rear of brackets 70 carry longitudinally-disposed straight-lined guide rails 72. The guide rails 69 cooperate with the guide rails 72 to form a bag or package passage 73 which extends from the bag-receiving table or platform 68 to the distant end of the machine.

The tie-rod 57 and connector member or members 56 are disposed in parallelism and the said tie-rod serves as a guide for slide-headers 74, 75 and 76 which are spaced apart and connected together in any approved manner so as to travel along said guide as a unit.

Each slide-header has a pusher arm 77 pivotally connected thereto and normally held in retracted position. Said slide-headers serve as part of the bag or package-feeding mechanism designed to intermittently move bags or packages placed on the supporting rail or track 67 in a forward direction, or to the right as viewed in Figs. 1 and 2, so that they are advanced from station to station indicated by the leters B, C, D and E, all as clearly disclosed in my said co-pending application, and as shown by dotted lines in Fig. 2 of the drawings in this application.

Figure 2:
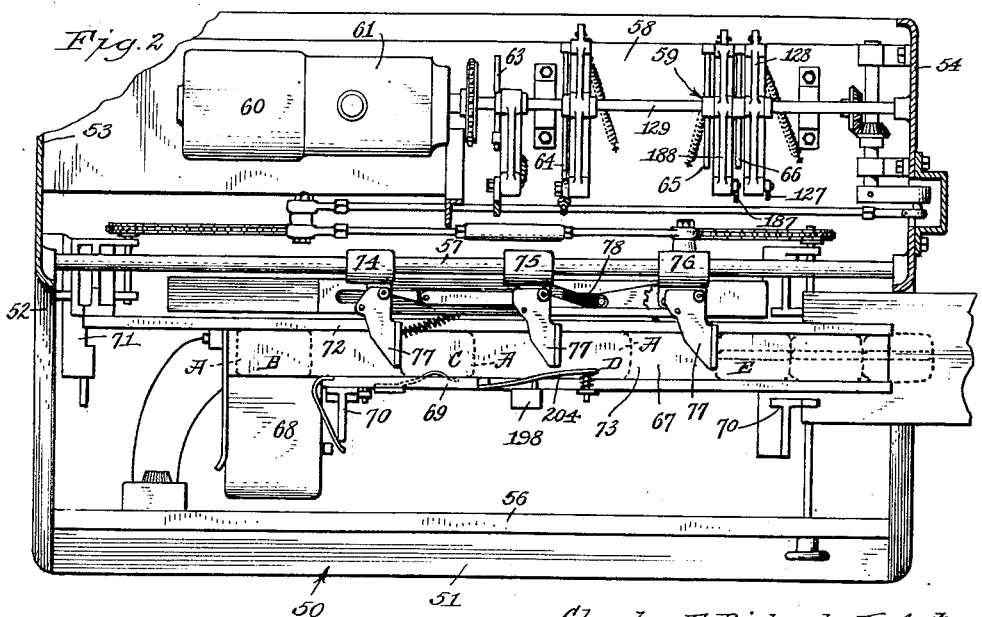
Fig. 2 is a sectional plan view of the bag-packaging machine.

Through the medium of a combination of mechanical elements interposed between the primary actuating mechanism 59 and the slide-headers 74, 75 and 76, the pusher arms of said headers are moved back and forth and under cooperation of a reversing track 78 arranged beneath said pusher arms, the latter are projected over the supporting rail or track 67 during their forward movement and caused to recede during their rearward or return movement; thus moving under ratchet action to engage the bags or packages on the rail or track and advance said bags or packages one station. Said pusher arms ride idly rearwardly and are projected in rear of the next following bag or package to advance the same one station on its forward movement. Upon actuation of the bag-feeding mechanism in a forward direction the bags are fed through the machine as follows; the bag at station B at the extreme left, as viewed in Figs. 1 and 2, is advanced to station C, the bag at station C to station D, the bag at station D to station E, and at said station E my improved labeling machine is brought into action and the label applied thereto in the manner to be described hereinafter. As the bags reach station D, bag-crimping and flap-folding mechanism 79 is actuated by suitable mechanical elements interposed between cams 63 and 64 and said mechanism, said cams forming part of the primary actuating mechanism 59. Under action of said bag-crimping and flap-folding mechanism 79, the free upper portions a of the front and rear sides or walls of the open partially filled bags are pushed toward each other under a crimping action, after which the free upper portions a of the outer and inner sides or walls are forced together and folded upon themselves to close the bag and form the upstanding fold $A^1$ with its laterally extending free flap $a^1$.

The bag thus closed by folding the four free upper wall portions $a^1$ of the bag is advanced from the folding station D to the labeling station E, and it is here to be understood that the conditioning of the bag or package for labeling is not necessarily associated with my improved labeling mechanism, since my improved labeling mechanism may be used independently of any other mechanism, or for the purpose of labeling bags or packages closed by hand to condition the same for labeling.

However, inasmuch as certain advantages are derived from associating my labeling mechanism with the bag-packaging machine disclosed in my said co-pending application, or with any other bag closing mechanism whereby an upstanding fold or flap, such as $A^1$ is provided, I desire to set forth herein the advantages thus derived and to claim inter alia the combination or association of elements or parts by means of which such advantages are derived.

Referring now particularly to the labeling mechanism of this invention, it may be stated that it can be supported as a unit within the frame 50 of the complete bag-packaging machine shown in Figs. 1 and 2, or within the frame of any other machine operating to close a bag by providing an outwardly or upwardly projecting fold or flap capable of having a label attached thereto.

In the drawings I have shown two parallel horizontally-disposed spaced-apart supporting rods 80, 81 on which are mounted two triangular brackets or frame members 82 disposed in spaced relation. The said supporting rods are fastened at their ends to the end member 54 and an intermediate member 83 forming part of the main frame 50 for the reason that the supporting rods 80, 81 and brackets or frame members 82 constitute a means of supporting my improved labeling mechanism, per se, and it is to be understood that this supporting means may be embodied in or associated with the main frame 50 or may be used independently thereof. It is also to be understood that while the supporting means comprising the rods 80, 81 and the triangular brackets or frame members 82 offer advantages when embodied in or associated with the main frame 50, any other means for supporting the labeling mechanism within the main frame 50, or independently of the latter may be employed.

The triangular brackets or frame members are secured to the spaced-apart supporting rods 80, 81 in any approved manner so that they are rigidly maintained thereon, and secured in the upper ends of said triangular brackets or frame members is a reel-supporting rod 84. Rotatably mounted on the rod 84 is a reel 85 around which is wound a strip of material 86 from one end of which pieces are to be severed intermittently during the operation of my improved labeling mechanism or device; the severed pieces to be applied to the upstanding folds, flaps or flanges formed by closing the bags in a manner to appear hereinafter. The strip material may be cellophane, wax-coated paper, or of any material having self-sealing properties under the application of heat thereto. The manner of securing the reel-supporting rod in the triangular brackets or frame members 82 and that of rotatably mounting the reel 85 on said rod is of no importance and may be effected in any approved manner.

Disposed beneath the reel 85 and carried by the supporting rods 80, 81 is the frame 87 of my labeling mechanism or device. This frame comprises two sections 88, 89, disposed so that the lower end of one is fitted within the upper end of the other; thus an upper section and a lower section are provided, the upper section 88 being directly supported by said supporting rods 80, 81 while the lower section 89 is adjustably secured to the upper section.

Said upper frame section comprises two side members 90, 91 fastened together in spaced relation by the supporting rods 80, 81 and a tie-rod 92.

The lower section of the frame 87 comprises two side members 93, 94 which are held in definite spaced relation by a tie-rod 95 and other parts of the labeling mechanism, as will appear hereinafter.

The side members 93, 94 of the lower frame section lie in contact with the parts of the outer sides of corresponding members of the upper sections, as best shown in Figs. 8 and 9, and corresponding sides of the two sections are fastened together by means of bolts 96 fastened in the side members of the lower section and passed through diagonal slots 97 in the side members of the upper section.

It will be understood that since the upper section 88 of the frame is rigidly mounted on the supporting rods 80, 81, the lower section is adjustable with respect to the upper section and the purpose of such adjustment will be made apparent in the descriptive matter to follow. It may, however, be here stated that the adjustment for the lower frame section is mainly vertical with a component inward or outward movement for the same.

The frame 87 of this labeling mechanism or device is maintained in a selected relation to the longitudinal top frame member 55 of the main frame 50 when this mechanism or device is to be used in association with my improved bag-packaging machine described and illustrated in my aforesaid co-pending application; said frame member serving as a support for certain movable parts of my improved labeling mechanism or device. When using such labeling mechanism or device independently of said bag-packaging machine or in conjunction with other types of bag-packaging machines, other suitable supports will be provided for directly supporting certain parts of this invention.

In the upper part of the upper section 88 of the frame 87, a strip-guiding roller 98 is rotatably arranged. This roller is transversely disposed and rotates on a rod 99 which also serves to tie the side members of said upper sections together and may be shouldered at opposite ends. Said rod 99 is so disposed that the shoulders thereof bear against the inner sides of the side members of said upper sections. This strip-guiding roller 98 may also have any suitable ball or other anti-friction bearing at opposite ends in operative relation to the rod 99 around which said roller is centered.

A similar strip-guiding roller 100 is disposed beneath the strip-guiding roller 98 and between the side members of the lower frame section 89. The strip-guiding roller 100 serves also as a direction-changing roller for the strip of material guided thereby.

Rotatably mounted in the side members of the lower frame section is a shaft 101 on which a strip-feeding reel 102 is secured in any approved manner; said reel 102 having a circular series of projecting nubs 103 centrally between its ends and on said shaft, outside of the lower frame section, a sprocket wheel 104 is secured which is intermittently rotated.

As stated, the labeling material is of strip form, it having a width which the length of the label to be sealed to a bag is to have and centrally along the strip spaced-apart openings 105 are provided, the spacing conforming to the spacing of the projecting nubs 103 on the strip-feeding reel 102. This strip has transverse weakening lines 106 centrally between its openings 105, along which the strip material is to be creased after severing the same transversely by using the center of each opening 105 as a guide.

The labeling material 86 having the openings 105 therein, and the weakening lines 106 formed by scoring, removing thermoplastic or other coating material along a straight line, or otherwise, is wound around a paper or other tube 107, and so prepared, side members 108 serving as part of the reel 85, have tapered inwardly-directed bosses which are forced into opposite ends of the tube 107 so as to secure the roll of labeling material to a sleeve 109; said side members being rotatable with said sleeve on the reel-supporting rod 84. The reel 85 may be termed a "paying-out" reel and it may be mounted in any suitable manner to enable it to be rotated, as it is drawn upon by the feeding reel 102.

The edges of the side members of the lower section of the frame 87 are irregularly formed so that different portions of these edges are in different planes. At the lower portion of each of said side members, an extension 110 is provided against which a gauge bar 111 is fastened, the upper edge of which is beveled downwardly and forwardly, as at 112.

Slanting forwardly from this gauge bar, which forms part of the strip-cutting mechanism of the device, is a table member 113, the upper surface of which is alined at its rear end with the beveled edge 112 of the gauge bar while the rear end is curved downward slightly, as at 114, and extends underneath the strip-feeding reel 102.

Said table member 113 extends transversely from side member to side member of the lower section 89 of the frame 87 and is marginally fastened to a hanger 115 in the form of a strip of sheet metal transversely disposed and having its ends fastened to said side members by means of bolts 116. This table member is spaced from the hanger 115 and for this purpose, spacer bars 117 are interposed between the ends of said hanger and the longitudinal marginal portions of the table member 113, bolts 118 fastening the three elements together. In this manner a passage 119 for the labeling material is provided and this passage is provided with means for slightly crimping the material as it passes through the same.

Fastened to the underside of the hanger 115 or hanger strip as it may be termed, are crimper elements 120 in the form of wires transversely disposed with reference to the hanger strip and longitudinally disposed with reference to the table member. These crimper elements are spaced equi-distantly across the medial portion of the hanger strip and are soldered or otherwise suitably fastened thereto.

Fastened in a like manner to the upper surface of the table member 113 are similar cooperating crimper elements 121 and these are disposed parallel to the crimper elements or wires 120 and positioned between the latter. There are consequently two series of crimper elements or wires between which the labeling material, while still in strip form, is compelled to pass and the series are so disposed relatively that the lower series tends to force the material upward slightly while the upper series tends to force the material downward slightly. Thus the strip, or sheet material if it may be so called, is subjected to a crimping action when passing through the crimping passage 119 provided between the hanger strip 115 and the table member 113.

It is to be noted that the crimper elements or wires 120, 121 extend both forwardly and rearwardly beyond the hanger strip 115 and these projecting portions serve as strip or sheet-guiding means.

During the operation of the machine the strip material 86, by reason of its being passed around the feeding reel 102 is, due to the projecting nubs 103 thereon entering the openings 105 in the strip, caused to move between the table member 113 and the forwardly-projecting ends of the upper series of crimping elements or wires 120 and thence betwen the two series of crimping elements 120, 121 while passing through the crimping passage 119 and rearwardly over and beyond the gauge bar 111; the end portion of the strip projected beyond said gauge bar determining the width of the label and the upper edge of the bevel 112 of said gauge bar determining the line at which the strip material is to be severed.

Were the strip material projected rearwardly, beyond the gauge bar 111 without crimping the same in substantially the manner shown in Fig. 22, it would have a tendency to droop and fail to position itself properly over a closed bag located in rear of the gauge bar 111 for sealing. It would also tend to create difficulty in severing the projected portion of the strip or sheet, which it will be understood from the description to follow is effected at the upper portion of the beveled edge of said gauge bar. Crimping of the strip or sheet material stiffens the latter and causes it to continue in its upwardly and rearwardly inclined feeding position.

Located at a predetermined distance in rear of the frame 87, which distance may be varied, depending on whether this labeling device is associated with the hereinbefore mentioned bag-packaging machine or independently thereof, is what I term combined driving and control mechanism, designated as a whole by the numeral 122. By the use of this mechanism and a controlled electric circuit, the actual labeling mechanism of my invention is actuated and actuation of such mechanism prevented when closed bags are not fed to the labeling mechanism, or when for any reason closed but unlabeled bags become trapped in the bag-packaging machine.

In said driving and control mechanism 122, a shaft 123 is included. This shaft is rotatable in suitable bearings (not shown) disposed at opposite sides of said mechanism and when this improved labeling mechanism is used in conjunction with my bag-packaging machine hereinbefore referred to, said shaft may be supported in suitable bearings secured to the end member 54 and the intermediate member 83. Loosely mounted on said shaft is a slide-actuating lever 124 having an arm 125 extending forwardly from the shaft 123 and an arm 126 extending rearwardly therefrom, the arm 126 being connected with the primary actuating mechanism 59, which as illustrated, is supported on the table frame member 58, but may be otherwise supported, particularly when the labeling mechanism or device is used independently of the bag-packaging machine. This primary actuating mechanism may be of any approved type serving to reciprocate a rod 127 which is pivotally connected at its upper end to the arm 126 of the slide-actuating lever 124 and thus causes said lever to oscillate.

In the embodiment of my invention shown, this rod has its lower end pivotally secured to a rocker arm 128 oscillatory on a rod or fixed shaft 129 actuated by the cam 66 secured to a shaft disposed beneath said rod or fixed shaft and driven by the motor 60 (Fig. 2). The forward end of the arm 125 is pivotally connected to the lower end of a link 131, the upper end of which is pivotally connected to a block 132 fastened to a vertically-disposed slide member 133 guided for reciprocating movement in suitable guides 134 fastened to a suitable support. As shown, the longitudinal frame member 55 may be utilized for such support. The slide actuating lever 124 is held against movement along the shaft 123 by means of collars 135 secured to said shaft at opposite sides of said lever.

The said slide member has attached to its lower end a combined heat-applying and label-folding device 136 comprising a head 137 bifurcated to receive the lower end of the slide member 133, which slide member is fastened to said head by means of bolts 138, or otherwise. Extending transversely through said head are spaced-apart parallel shafts 139, 140, the ends of which project from opposite sides of said head and have normally spaced apart folder members 141, 142, keyed or otherwise fastened thereto so that upon rocking of said shafts, the folder members are moved towards and away from each other. Folder member 142 is provided with an electric heating coil 143 and a thermostatic control 144, said member 142 being cored out to receive said coil and control, as best indicated at 145, Figs. 23, 24 and 25.

When the electric current is supplied to the coil 143, the temperature of the heat applied to the folder member 142 is controlled by the thermostatic control 144. During the operation of the machine, current applied to the coil of folder member 142 is constant.

To the projecting ends of the shafts 139, 140 at one end of the head 137, trip arms 146 are secured and at the outer ends of these arms rollers 147 are fastened which ride in contact with opposite edges of a vertically-disposed cam member 148 adjustably fastened to the inner side of the side member 90 of the upper section of frame 87. This cam member is in the form of a narrow strip or bar, reduced in width between its ends as at 149, Fig. 10. The edges of this reduced portion merge into the edges of the widened upper end portion 150 and the widened lower end portion 151 of said cam member. Said trip arms are maintained at all times against opposite edges of said cam member by means of a retractile spring 152 having its ends secured to studs 153 projecting inwardly from said trip arms.

In normal position, the slide member 133 is at the upper end of its reciprocating movement and the rollers of the trip arms 146 lie in contact with the edges of the widened upper end portion of the cam member 148. Since these trip arms and the folder members 141, 142 are all secured to the parallel shafts 139, 140 rotatable in the head 137, the swinging movement of the folder members is controlled by the movement of the trip arms 146.

It will be apparent that the vertical movement of said trip arms and folder members is controlled by the movement of the slide member 133, and when the rollers of the trip arms 146 are in contact with the widened upper portion of the cam member 148 the folder members are in contact with each other. In this position heat from folder member 142 is transferred to folder member 141 by conduction. As the slide member 133 is lowered by the slide-actuating lever 124, the rollers 147 on the trip arms 146 move downwardly in contact with the opposite edges of the cam member 148 and at the same time the folder members are also moved downwardly. As the rollers of the trip arms travel downwardly, the trip arms approach each other under action of the retractile spring 152. This is permitted by reason of the rollers coming in contact with the reduced or narrowed portion 149 of the cam member and thus the folder members 141, 142 becomes separated and in this position they continue downwardly under the downward movement of the slide member 133 and travel along opposite sides of a slender folder gauge 154 which is in the form of a horizontally-disposed wire sufficiently rigid to retain a straight-lined condition and secured to the lower end of a hanger bar 155 fastened at its upper end to the rear edge of the side member 93 of the lower section of the frame 87. In its broader aspect, the folder gauge may be termed a paper or label support.

Placed against the lower ends of the front and rear sides of the hanger bar are spacer bars 157, 158 applied as best shown in Fig. 10, to the outer sides of which are strap hangers 159, 160. These strap hangers are secured, respectively, to the front side of the front spacer bar 157 and to the rear side of the rear spacer bar 158. A similar hanger bar 155ª is fastened to the rear edge of the side member 94 of the lower section of the frame 87 and to the front and rear sides of this hanger bar, spacer bars 157ª and 158ª are applied. Strap hangers 159ª, 160ª are secured to the outer sides of the spacer bars 157ª and 158ª, and to the lower ends of the strap hangers 159, 160, 159ª and 160ª guide strips 161, 162 are secured; said guide strips being spaced apart with their inner edges in opposition and the spacing thereof forming a guide passage 163 through which the upstanding folds or flanges $A^1$ of the closed bags are passed as they are fed through my improved labeling mechanism or device.

These guide strips extend laterally from their strap hangers in the direction from which the closed bags approach this labeling mechanism and the guide passage 163 is gradually widened toward its fold-receiving end. Thus if a closed bag formed with an upstanding fold or flange A¹ approaches the labeling mechanism out of true alinement with the guide passage 163, the bag will be directed into the parallel-sided narrowed portion of the guide passage and when so positioned the upstanding fold or flange will have passed beyond the lower end of the hanger bar 155 and its upper edge will be slightly spaced from the folder gauge 154. Therefore, when the bags reach station E in the bag packaging machine, assuming my improved labeling mechanism is incorporated in such machine, the upstanding fold or flange of the bag will be positioned directly underneath and parallel with said folder gauge 154, as clearly shown in Figs. 10 and 24.

At the time that the bag is disposed underneath the folder gauge in the manner stated, the end of the strip of labeling material will have been extended beyond the gauge bar 111 and have assumed the position shown in dotted lines in Fig. 24; such action occurring while the folder members 141, 142 have their lower ends still in a plane above the folder gauge 154. The separated folder members will be moved downwardly to opposite sides of the folder gauge and before such action, the labeling material will have been severed along the gauge bar 111, as shown in full lines in said Fig. 24; thus the end portion of the labeling material will be free of the strip and the weakened or otherwise fold line 106 thereof will rest upon the folder gauge. As the folder members 141, 142 move downwardly, the severed piece of labeling material is gradually bent downwardly over the folder gauge 154 and over the sides of the upstanding fold or flange A¹ of the closed bag positioned between the guide strips 161, 162 and during the final downward movement of said folder members, the rollers of the trip arms 146 will travel in contact with the lower widened portion of the cam member 148, at which time the folder members are moved toward each other as closely as the upstanding fold or flange A¹ and the labeling material 86 covering opposite sides of said fold or flange permit, thus creating pressure against the labeling material and applying heat thereto from opposite sides so that the labeling material is sealed to said fold or flange. This labeling material may have printed or otherwise impressed thereon the names of the contents of the material in the bag A, the manufacturer or distributor, the weight of the same and/or any other matter considered desirable by the packager, manufacturer, or for the customer.

It will, of course, be understood that these folder members 141, 142 are gradually brought into close relation to each other during the final portion of their downward movement by reason of the rollers of the trip arms 146 traveling from the reduced, narrowed or intermediate portion 149 of the cam member onto the widened lower end portion 151 thereof.

The upper edge of the upstanding fold or flange of each bag A is slightly spaced from the lower end of the hanger bar 155 as it is moved underneath the labeling mechanism and as the bag is momentarily stopped when positioned for labeling, said upper edge is parallel or substantially parallel with the folder gauge 154. When the bag is labeled in the manner described, the folder gauge is enclosed between the folded or recurved upper portion of the labeling material and the upper edge of said fold or flange, preferably somewhat loosely, as illustrated in Figs. 25 and 26 of the drawings so that the labeled bag or package can be easily stripped from the folder gauge 154 or spindle, as it may be termed. The folder gauge or spindle is therefore slidably entered in a loop-hole formed by the recurved portion of the labeling material and the edge of the fold or flange rising from the bag or package. As the next succeeding bag is brought to the station E it engages the labeled bag and causes the latter to be advanced and during this action the labeled bag is slipped from the folder gauge and moved forwardly with the upper looped portion of the label passing underneath the hanger bar 155ª; said last mentioned bar being somewhat shorter than the hanger bar 155 so as to furnish the necessary clearance for the labeled bag to be advanced and passed out of the labeling mechanism.

The slide member 133 has yieldingly connected thereto a pusher member or bar 164 slidable in guides 165 extending forwardly from the slide member 133 and in a bracket 166 extending forwardly from the upper end of the slide member 133. The upper portion of this pusher bar is surrounded by an expansion spring 167 which bears at one end against the bracket 166 and at its other end against a collar 168 resting upon an upwardly facing shoulder 169 on said pusher bar. The tendency of said expansion spring is to maintain the pusher bar in its lowermost position, wherein its lower end is maintained in contact with strip cutting or severing mechanism. At the lower end of this pusher arm and to the front side thereof a pusher block 170 is secured and it normally bears against a cutter head 171 disposed between and pivotally secured to the outer ends of carrier levers 172 disposed at opposite sides of the strip feeding reel 102; one end of each of said carrier levers being pivotally secured to the shaft of said reel and the other ends of said levers having the cutter head 171 pivotally secured therebetween.

It is to be noted that the gauge bar 111 of the cutting or severing mechanism has upward extensions 173 at opposite ends. These are for guiding the cutter head 171 in its movement with respect to the gauge bar 111. The cutter head is in the form of a flat member 174 through the upper end of which a rod 175 is passed which is secured at the outer or rear ends of the carrier levers 172, collars 176 being secured to said rod and bearing against opposite end edges of said flat member to hold the latter against movement lengthwise on said rod (see Figs. 5 and 20).

To the lower end of said flat member a cutter bar 177 is secured. This cutter bar has its lower edge beveled in the direction of the bevel of the gauge bar 111 and it extends a distance beneath the lower end of said flat member 174. When the slide member 133 is in its elevated position the beveled edge of the cutter bar 177 is spaced from the beveled edge of the gauge bar 111, so that the strip of labeling material can pass between the two.

I preferably incline the lower edge of said cutter bar 177 slightly upward from a medial point toward opposite ends, as best shown in Figs. 5 and 20, thus aiding in the cutting action of the cutter bar against the strip material.

For the purpose of retaining the cutter bar 177 against the gauge bar 111 and its extensions 173 at all times, retractile springs 178 are employed at opposite sides of the cutter frame, which may be considered as comprising the carrier levers 172 and the cutter head 171 to which the cutter bar 177 is secured. These springs have their rear ends secured to the cutter head, as at 179, and their front ends fastened to the carrier levers 172, as at 180 (see Fig. 10). Thus the cutter head is swung forwardly at all times under action of the retractile springs 178 and the cutter bar thus maintained in cutting relation to the gauge bar 111.

It is intended that normally this cutter head and its cutter bar 177 be maintained in its elevated position and this is effected by retractile springs 181 secured at their upper ends to the inner sides of the side members of the lower frame section 89, as at 182, and at their lower ends to the carrier levers 172, as at 183, Fig. 10. These springs serve to maintain the cutter head 171 in a fixed position with relation to the beveled or cutting edge of the gauge bar 111 and when the cutter frame so called is in its elevated position the upper edges of the carrier levers 172 bear against stops 184 at the opposite ends of the strip guiding roller 100, as best shown in Fig. 13.

It is to be noted that the pusher block 170 fastened to the lower end of the pusher member or bar 164 bears against the upper end of the cutter head 171 and is there held at all times under the action of the expansion spring 167 surrounding its upper end. However, as the slide member 133 moves downwardly under the action of the slide actuating lever 124, the pusher member or bar 164 moves downwardly with it so that this pusher member or bar acting against the cutter head forces said head downwardly and with it the cutter bar 177, thus severing the projected portion of the strip of paper from the strip proper.

The downward movement of the cutter head is limited in any approved manner such as by means of stop lugs 185 at opposite ends of the cutter bar which strike the upper ends of the upward extensions 173 and prevent further downward movement of the cutter bar and other parts of the cutter mechanism associated therewith. Thus the downward movement of the pusher member or bar 164 is limited during the time that the slide member continues its final downward movement and at such times the expansion spring 167 becomes slightly compressed. It will, therefore, be apparent that the action of the pusher member or bar 164 is dependent upon the action of the slide member 133, but that the slide member 133 is capable of movement independently of the pusher member or bar 164.

On the shaft 123 adjacent the slide-actuating lever 124 a rocker frame 186 is loosely mounted and a portion thereof extends forwardly from said shaft and has pivotal connection with an actuating rod 187, the lower end of which is operatively connected to a rocker lever 188 actuated by the cam 65 of the primary actuating mechanism. Both the cams 65, 66 are mounted in the manner of the cams serving as part of the primary actuating mechanism in my aforesaid co-pending application, but any other mechanism suitable for the purpose of reciprocating the actuating rod 187 and the actuating rod 127 may be employed under proper synchronization with respect to each other.

Loosely mounted on the shaft 123 adjacent the rocker frame 186 is a ratchet wheel 189 which is fastened to a sprocket wheel 190 in any suitable manner. Trained around the sprocket wheel 190 and the sprocket wheel 104 secured to the shaft of the strip-feeding reel 102 is a sprocket chain 191. In order to maintain said sprocket wheel in taut condition it may be trained underneath a sprocket wheel 192 rotatable on the supporting rod 81 by means of which the frame 87 of my improved labeling mechanism is supported.

Secured to the lower end of the rocker frame 186 is an angle iron 193 serving as a shelf or support for a solenoid 194 which is to be energized by means of current passing through wires 195, 196, 197, forming an electric circuit in which the main switch 62 and a micro switch 198 are included. This circuit is controlled by the passage of the bags through the bag-packaging machine. The core 199 of this solenoid is adapted to move outwardly and inwardly from the spool of the solenoid and it has one end of a link 200 pivotally connected therewith; the other end of said link being pivotally secured to a pawl 201 held in contact with the teeth of the ratchet wheel 189 by means of a retractile spring 202 secured at one end to a stud 203 which extends from the edge of the pawl at the side of its axis opposite that at which the pawl successively engages the teeth of the ratchet wheel, the pawl being so held under action of the retractile spring 202.

When the machine is in operation and the main switch 62 is closed, the various mechanism constituting the bag-packaging machine is operated under control of suitable electric circuits and under such operation bags A, partially filled, but having their upper ends open are placed successively upon the platform 68, pushed onto the bag or supporting rail or track 67 and by means of the pusher arms 77, are forced along the latter under ratchet action of said pusher arms, all as clearly set forth in my aforesaid copending application.

As the bags successively pass through the bag or package passage 73, a spring arm or spring-controlled arm 204 associated with the micro switch 198 closes the latter, thereby energizing the solenoid with the result that the pawl 201 is disengaged from the ratchet wheel and during the period of disengagement the rocker frame 186 is caused to swing on the shaft 123, moving the pawl idly under retrograde movement into position to engage the next tooth of the ratchet wheel. This idle movement of the rocker frame and pawl takes place while the slide member 133 is in its uppermost position under action of the slide-actuating lever 124. At such times the rollers 147 of the trip arms 146 lie at opposite sides of and engage the edges of the cam member 148 at its widened upper end, causing the trip arms to be separated, which action results in the folder members 141, 142 being brought into contact with each other and since the heating coil 143 is included in a live electric circuit under temperature control of the thermostatic device 144, the folder member containing said heating coil is heated and causes the heat thereof to be conducted to the folder member 141.

The cam 65 is so formed, or other primary actuator so constructed, that the actuating rod 187, which will have been forced downwardly to move said folder members and said trip arms upwardly, will be so momentarily held and during such action the actuating rod 127 will be actuated to cause rotation of the strip-feeding reel, with the result that the end portion of the strip 86 passing through the crimping passage 119 will have been crimped and a portion of the strip, equi-distantly between successive openings 105 therein, will have been projected outwardly beyond the gauge bar 111 so that the weakened or fold line 106 will lie over the folder gauge 154. Thus positioned the projecting portion of the labeling material is ready to be severed by the cutter bar 177.

The primary actuating mechanism, operated continuously by the motor 60, causes upward movement of the actuating rod 127, which in turn moves the arm 125 downwardly and with it the slide member 133. This causes the folder members 141, 142 and the trip arms 146 to be moved downwardly, with the result that the rollers 147 of said trip arms ride downwardly in contact with opposite edges of the cam member 148 and as these rollers reach the narrowed intermediate portion 149 of said cam member, the trip arms are drawn toward each other by the retractile spring 152, thereby separating the folder members 141, 142. This movement of the folder members positions them to travel downwardly in planes at opposite sides of the folder gauge 154 and as these folder members come in contact with the projecting portion of the labeling material as illustrated in Fig. 24, the cutter bar 177 will have been lowered beneath the beveled edge of the gauge bar 111, due to the fact that the pusher bar 164 which carries the pusher block 170 will have depressed the cutter head carrying said cutter bar until the latter has reached the end of its downward movement, limited by stops 185 formed on the front face of the cutter bar and having their lower ends engaging the upper ends of the upward extensions 173 on the gauge bar. Other stop means for this purpose may be employed if desired.

It will be understood that when the downward movement of said cutter head is arrested, the downward movement of the pusher bar 164 will be arrested and due to the intervention of the expansion spring 167 between the slide member 133 and the pusher bar 164, the downward movement of the slide member 133 may be continued under the downwardly swinging action of the arm 125 of the actuating lever 124. It will, therefore, be understood that the projecting portion of the labeling material, whether wax paper or other flexible material serving the purpose and having the quality of adhering to the upstanding folds or flanges of the bags under heat, will have been severed as the lower ends of the folder members 141, 142, while in maximum spaced relation, come in contact with the labeling material then resting upon the folder gauge; and during the remainder of the downward movement of said folder members the severed piece of labeling material will be folded downwardly over the folder gauge and towards opposite sides of the upstanding flange $A^1$ of the bag which will have been brought into position underneath and parallel with the folder gauge by the time the labeling strip is being severed by the cutter mechanism. Further downward movement of said folder members force opposite overhanging portions of the labeling material closer to opposite sides of the upstanding fold or flange $A^1$, as best shown in Fig. 25, and during the final downward movement of said folder members, the rollers 147 of the trip arms 146 will have traveled downwardly along the edges of the cam member 148 and will have reached the widened lower end 151 of said cam member with a result that the trip arms will be swung outwardly away from each other against the action of the retractile spring 152. By reason of these trip arms and the folder members being secured to the shafts 139 and 140, said folder members will be swung toward each other and force the opposite portions of the labeling material against the opposite sides of the upstanding fold or flange $A^1$ with sufficient pressure to cause the heat thereof to seal the labeling material against opposite sides of the fold or flange; this position of the folding members being retained until the part of the primary actuating mechanism causing actuation of the rod 187 moves said rod downwardly, with the result that the arm 125 of the actuating lever is swung upwardly; thereby moving the slide member or bar 133 upwardly and the folder members and trip arms carried thereby. While the slide member is moving upwardly, pressure on the expansion spring 167 surrounding the pusher rod is gradually relieved and the pusher rod caused to move upwardly with the slide member. During this action, the carrier levers 172 and the pusher head and cutter bar carried by said levers are permitted to move upwardly under action of the retractile springs 181 until the upper edges of said carrier levers contact the stops 184 at opposite ends of the strip-guiding roller 100 or are otherwise arrested in their upward movement under any suitable modified form of stop means.

During the upward movement of the slide member, the folder members are caused to move outwardly away from each other, such action being controlled during the time the rollers 147 of the trip arms travel upwardly in contact with the narrowed intermediate portion 149 of the cam member 148. During the final upward movement of such parts, the rollers move onto and travel in contact with the edges of the widened upper portion of said cam member and so long as said folder members are in contact with each other, heat from the heating coil in the folder member 142 is transferred by conduction to the folder member 141.

While the guides 165 may be constructed in any manner permitting movement of the slide member 133 independently of the pusher bar 164, I prefer the construction of the same in the manner illustrated in Fig. 11, wherein the guides 134 are fastened by means of bolts 205 to the longitudinal top frame member 55 of the bag packaging machine and between which guides, which serve as a slideway, the slide member 133 is vertically movable.

The guides 165 for the pusher member or bar 164 include guide-blocks 206 fastened to the slide member 133 by means of bolts 207, to which guide-blocks, guide-strips 208 are secured and between which guide-strips the pusher bar 164 is disposed, each guide having a keeper-strip 209 fastened to the guide-strips 208 and guide-block 206, thus forming a guideway for the pusher bar; said guide-strips and guide-block having bolts 210 passed therethrough which are threaded into lateral extensions on the guide-blocks 206.

It will be apparent therefore that as the arm 125 of the actuating lever 124 is swung upwardly and downwardly on the shaft 123 as its center, the slide member is reciprocated vertically and the pusher bar 164 caused to move with the slideway until the latter is stopped in its downward movement and the expansion spring 167 compressed, whereupon the slide member 133 continues in its downward movement to effect the labeling of the upstanding flange A¹ on the bags A as they are brought successively underneath the labeling mechanism.

Since the bags to be labeled vary in size, with the result that the width of the upstanding folds or flanges A¹ on the bags will also vary, the folder gauge 154 may be spaced varying distances from the cutting edge of the cutter bar 177; this being accomplished by substituting narrower or wider spacer bars 157, 158 for those shown in the drawings, and if desired narrower or wider guide strips 161, 162 may be substituted for those shown to maintain the desired width of the guide passage 163 or to vary the width, depending on the thickness of the upstanding folds or flanges A¹ on the bags being labeled.

When using labeling material weakened or otherwise treated for folding medially between the openings 105 therein and using said openings as points determining the lines for severing the labeling material, a strip feeding reel 102 having its nubs differently spaced will be substituted for the reel shown in the drawings, the spacing of the nubs being in accordance with the spacing of the openings 105 in the labeling material.

For the purpose of adjusting other parts of the paper feeding and labeling mechanism, the bolts 96 may be loosened and the lower section 89 of the frame 87 adjusted with respect to the upper section 88 thereof, after which bolts 96 may be tightened and the two sections firmly connected together so as to be in effect a unitary frame structure.

Where in the claims the term "paper" is employed, it is to be considered as including any flexible material having the qualities of paper insofar as the folding of the same is concerned and the term "paper" is also to include flexible material, whether delivered to the slender paper-supporting or folder gauge in label size or as a part of a strip or sheet to be severed to form the label and capable of adhering to a portion of a bag or package against which it may be directed by the application of heat thereto, and under the terms of certain of the claims, to include affixation by other means.

Where in the specification and claims the term "commodity" is used, I mean all goods or materials capable of being packed in containers or bags, and particularly paper bags partially filled with the goods or material and closed by folding the free upper portions of the four sides thereof to form an upstanding fold or flange over which in the specific or preferable form of label is applied, the labeling material preferably possessing the quality of self-sealing itself to opposite sides of the upstanding fold or flange under the application of heat.

In its broader aspect, the term "fold" or "flange" as herein used means any projecting portion of a bag or other container to which a label can be applied by folding the label or labeling material over the same, and causing it to adhere or be fastened to said projecting portion.

It is to be understood that the various mechanisms and parts embodied in this device may be modified without departing from the spirit of my invention, all in conformity with the scope of the appended claims.

Having thus described my invention, what I claim is:

1. Labeling mechanism for applying labels to bags or packages having upstanding folds closing the same, said mechanism comprising a pair of folder elements, a slender label support approximating in transverse dimension the thickness of said folds over each of which a piece of labeling material is placed lengthwise and underneath which the upstanding fold of a closed bag or package containing a commodity is situated, means to move said folder elements to engage and fold portions of said piece of labeling material overhanging said label support while resting medially thereon, and means to move said folder elements inwardly towards each other to fasten opposite portions of the folded labeling material against said upstanding fold.

2. Labeling mechanism for applying labels to bags or packages having upstanding folds closing the same, said mechanism comprising a pair of spaced-apart folder elements, a slender elongated paper support over which a piece of flexible labeling material is transversely fed and underneath which the upstanding fold of a closed bag or package containing a commodity is situated substantially parallel therewith, means to move said folder elements perpendicularly to said slender elongated support to position portions of said labeling material so as to overhang opposite sides of said upstanding fold, said folder elements including means to press and fasten said overhanging portions to opposite sides of said upstanding fold.

3. Labeling mechanism for applying labels to bags or packages having upstanding folds closing the same, said mechanism comprising a pair of folder elements, a slender elongated support disposed in a plane passing between said folder elements, means to feed a piece of labeling material transversely over said support so as to rest medially thereon and overhang the same at opposite sides thereof for attachment to an upstanding fold on a closed bag or package containing a commodity, two spaced apart folder elements normally disposed above said piece of labeling material and positioned so that said slender elongated support lies in a plane passing between said folder elements, means to move said folder elements downwardly to fold the overhanging portions of said piece of paper over opposite sides of said upstanding fold, and means operatively connected to said folder elements to move the latter inwardly towards said upstanding fold and force and fasten the opposite overhanging portions of said piece of labeling material against said fold.

4. Labeling mechanism for applying labels to bags or packages having folds extending outwardly therefrom so as to close the same, said mechanism comprising a pair of folder elements, a slender label support of a transverse dimension approximating the thickness of each of said folds and against one side of which a piece of labeling material is placed and adjacent the opposite side of which the outwardly-extending fold of a closed bag or package containing a commodity is situated, means to move said folder elements to fold said piece of labeling material over said label support and to fasten opposite side portions of the folded labeling material against opposite sides of said outwardly extending fold, and means to move said bag or package after being labeled along said slender label support to remove the latter from within the folded portion of the labeling material.

5. Labeling mechanism for applying labels to bags or packages having upstanding folds so as to close the same, said mechanism comprising a slender elongated element over which is placed a piece of flexible material serving as a label and adapted to be applied to the upstanding fold of a bag or package, means to loosely fold said piece of flexible material over said slender elongated element and said fold and to press and secure the opposite folded portions of said flexible labeling material against opposite sides of said fold, and means to strip the so loosely folded piece of labeling material from said slender elongated element by movement of the labeled bag in the direction of the length of said slender element.

6. Labeling mechanism for applying labels to bags or packages, comprising means to support a strip of flexible labeling material, means to feed said strip of material from said support so that one end portion thereof projects beyond the same, a slender element disposed at a right angle to the direction in which said strip of material is fed from said support and over which the projecting portion of said material is positioned, said slender element being designed to have a portion of a bag or container positioned therebeneath, means to sever the projecting portion of said strip material from the remainder thereof, means to fold the severed portion of said material over said slender element and to press and cause the opposite folded portions to be fastened to said bag or package, and means to move said bag or package after being labeled in the direction of the length of said slender element to discharge the same from said labeling mechanism.

7. Labeling mechanism for applying labels to bags or packages, comprising means to support a strip of flexible labeling material, means to feed said strip of material so that one end portion thereof projects beyond said supporting means, a slender element disposed at an angle to the direction in which said strip of labeling material is fed from said support and over which the projecting portion thereof is positioned, said slender element being designed to have a fold on a closed package containing a commodity positioned therebeneath substantially parallel therewith and with its edge confronting said slender element, a slide member movable vertically, a cutting device controlled in action by said slide member to sever the projecting portion of said strip of labeling material from the remainder thereof, and spaced-apart folding elements carried by said slide member and movable downwardly with said slide member to engage the severed part of said flexible labeling material and fold the same over said slender element along opposite sides of said upstanding fold and to secure the so folded opposite portions of the severed part of said flexible labeling material to said upstanding fold, and means to move said bag or package free of said slender element while retaining the folded portion of said labeling material with a recurved upper portion spaced from said fold.

8. Labeling mechanism for applying labels to bags or packages, comprising a wire support over which a piece of flexible labeling material is adapted to be supported medially and underneath which an upstanding fold on a bag or package is situated in spaced relation parallel therewith, normally spaced-apart vertically reciprocable folder elements movable at opposite sides of said wire support and said fold to engage and fold said labeling material over said wire support and along opposite sides of said fold with the latter in spaced relation to said wire support, means to cause movement of said folder elements toward said fold and secure them thereto as said folding elements reach the end of their downward movement, and means to move said bag or package along said wire support to disengage the bag or package therefrom.

9. Labeling mechanism for applying labels to bags or packages, comprising a slender support for a piece of flexible labeling material medially in contact therewith, a slide member movable perpendicularly with respect to said support, spaced-apart shafts carried by said slide member and disposed parallel to said slender support, folder elements secured to said shafts and disposed to travel in paths at opposite sides of said slender support to fold said labeling material downwardly thereover and at opposite sides of a projecting portion of a bag or package movable in the direction of the length of said slender support and positioned momentarily underneath the latter, trip arms secured to said shafts, said projecting portion of said bag or package being slightly spaced from said slender support to provide clearance between the two and allow slippage therebetween after labeling, a fixed cam element engaging said trip arms during the movement of said slide member to cause said folder elements to oscillate during each cycle of movement of said slide member and to thereby press the labeling material in contact with the projecting portion of said bag or package and permit fastening of said labeling material to opposite sides of said projecting portion, and means to move said bag or package so as to slip the folded labeling material from said slender support.

10. Labeling mechanism for applying labels to bags or packages, comprising a slender horizontally-disposed support for a piece of flexible labeling material self-sealing under the application of heat thereto and medially in contact therewith, means to secure said slender support at one end only to provide a free opposite end for the same, a slide member vertically reciprocable, spaced-apart shafts carried by said slide member and disposed parallel to said slender horizontally-disposed support, folder elements confronting each other and secured to said shafts, said folder elements being disposed to reciprocate vertically in paths at opposite sides of said slender horizontally-disposed support to fold said labeling material downwardly thereover and at opposite sides of an upstanding fold on a bag or package positioned underneath said slender support with its upper edge of said fold slightly spaced from said support, one of said folder elements containing a heating-medium and the other being heated by conduction from contact with said last-mentioned folder element, trip arms secured to said shaft, and a fixed cam element engaged by said trip arms during the movement of said slide member to cause said folder elements to oscillate during each cycle of movement of said slide member, said folder elements being movable towards and away from each other under control of said fixed cam element and being normally in contact with each other when in their elevated or inactive positions, said cam element causing said folder elements to press the labeling material in contact with the upstanding fold of said bag or package as they approach the end of their downward movement and cause adherence of the labeling material to said fold under the heat conveyed thereto by said folder elements, the bag so labeled being removable by slipping the looped portion of the label over the free end of said slender horizontally-disposed support.

11. Mechanism for applying labels to bags or packages, comprising a slender elongated paper support serving as a folder gauge over which a piece of paper possessing the quality of adherence under heat is placed, means to fold said piece of paper self-sealable under heat over said folder gauge and press the same against a portion of a bag or package situated in proximity to said folder gauge with clearance between the two, said means being heated to cause the piece of paper pressed thereby against the bag or package to adhere to the latter, and means to move the labeled bag or package in the direction of the length of said support to cause the label applied to the bag or package to be slipped free from said support.

12. Mechanism for applying labels to bags or packages having upstanding folds at their upper ends, said mechanism comprising a slender paper support serving as a folder gauge over which a piece of paper is placed, and means to fold said piece of paper over opposite sides of said folder gauge to form a loop-hole between the latter and the upstanding fold of a bag or package, to press said paper against an upstanding fold on a closed bag or package and cause the paper so folded against said fold to be fastened to the latter, and means to disengage said folder gauge from said loop-hole.

13. Mechanism for applying labels to bags or packages having upstanding folds, said mechanism comprising a slender elongated paper support serving as a folder gauge, means to feed a piece of paper transversely over said folder gauge so as to rest medially thereon for attachment to an upstanding fold on the upper end of a closed bag or package containing a commodity, two folder members movable in planes at opposite sides of said folder gauge, means to move said folder members to cause the piece of paper to be folded downwardly over said folder gauge and against opposite sides of said upstanding fold, means operatively connected with said folder members to cause the latter to be moved downwardly and toward said upstanding fold to form a loop through which said folder gauge loosely extends and force and fasten opposite portions of said piece of paper against the latter, and means to move said bag or package so as to slip said loop and the bag or package from which it extends from said folder gauge.

14. Mechanism of the kind described, comprising a frame, a paper feeding element mounted in said frame, means to intermittently feed labeling paper through a portion of said frame and outwardly to project a distance therefrom, cutter mechanism for cutting the projected portion of the labeling paper from the remainder thereof, a folder gauge over which the projected portion of the paper is passed and along which the severed piece of paper medially rests, means to fold the severed piece of paper downwardly over said folder gauge and against opposite sides of an upstanding fold to close the upper end of a bag or package, said folding means being equipped with means to cause opposite portions of the folded piece of paper to be fastened against said upstanding flap while looping the medial portion thereof over said folder gauge, and means to move said bag or package in the direction of the length of said folder gauge to disconnect the labeled bag or package from said folder gauge.

15. Mechanism of the kind described, comprising means to intermittently move bags containing a commodity and having an upstanding fold along a predetermined path, a frame disposed above said path and having means to feed paper therefrom so as to project a predetermined distance from said frame, a spindle over which the projecting portion of the paper lies, cutter mechanism carried by said frame and adapted to sever the projecting portion of the paper from the remainder thereof, means to momentarily retard the movement of said bags along said path so that a bag is momentarily centered beneath the severed piece of paper, means to fold and fasten the severed piece of paper over the upstanding flange of the bag or package centered thereunder and to loop the same to form a loop-hole above said flange into which said spindle projects, and means disposed along the path of said bags actuated by the successive bags in their line of travel along said path to cause feeding of the strip of paper from said frame at intervals timed with the movement of said bags along said path, said bag-moving means serving also to strip said loop from said spindle.

16. In a bag labeling machine, a track along which closed bags having an upstanding fold are adapted to travel and be momentarily halted at a fixed station in their path of travel, a slender folder gauge in close proximity to said fixed station and underneath which the upstanding fold of the halted bag is positioned, said folder gauge having a piece of labeling material positioned medially thereon, and folder elements movable downwardly at opposite sides of said folder gauge and said upstanding fold while in contact with the piece of labeling material to fold the same downwardly at opposite sides of said upstanding fold and to press the folded labeling material against opposite sides of said upstanding fold under the application of heat and thus form a loop into which said folder gauge extends, the loop so formed being sufficiently loose on said folder gauge to permit the bag and the label applied thereto to be stripped from said folder gauge under advancing movement of the bag along said path.

17. In a bag labeling machine, a track along which closed bags having an upstanding fold are adapted to travel and be momentarily halted at a fixed or labeling station in their path of travel, a fixed slender folder gauge in close proximity to said fixed station and underneath which the upstanding fold of the halted bag is positioned, said folder gauge having one end free, guide strips spaced apart to form a passage in a plane beneath said folder gauge and through which passage the upstanding fold of the bag is designed to pass, said folder gauge having a piece of labeling material positioned momentarily thereon, and folder elements moved downwardly at opposite sides of said folder gauge and said upstanding fold while in contact with the piece of labeling material to fold said material downwardly and fasten the same to opposite sides of said upstanding fold to thus form a loop into which the free end of said folder gauge extends, said bag or package when so labeled being slipped from said folder gauge under movement away from its labeling station.

18. In mechanism of the kind described wherein a label is to be folded over an upstanding fold on a closed bag, a slender horizontally-disposed folder gauge over which a piece of flexible labeling material is adapted to rest with portions thereof extending in opposite directions laterally therefrom and underneath which and in close proximity therewith the upper edge of an upstanding fold on the bag is positioned, a reciprocating folder device movable vertically and having folder members movable toward and from each other during each cycle of movement, one of said folder members including a heating unit whereby said member is heated, means to move said folder members into contact with each other during the latter part of its upward movement so that the heated folder member conducts the heat to the other folder member, said means causing said folder members to pass downwardly at opposite sides of said folder gauge and the upstanding fold beneath said gauge during a portion of their downward movement and thereby fold the labeling material resting on said folder gauge downwardly against opposite sides of the said fold, said means also serving during its final downward movement to cause the folder members to move toward each other and press the labeling material against opposite sides of said upstanding fold under the application of heat applied to said labeling material at opposite sides of said upstanding fold and causing said folder members to separate during its initial upward movement so as to freely pass upwardly at opposite sides of said folder gauge.

19. A machine of the kind described, a frame supporting a strip of flexible labeling material, means to feed a predetermined portion at the end of the strip out of said frame, a folder gauge spaced a distance from said frame at the point where said labeling material projects therefrom, said folder gauge being adapted to have a bag moved thereunder and said bag having an upstanding fold at its upper end, the upper edge of said upstanding fold being directly beneath said folder gauge and in closely spaced, relation thereto, vertically reciprocating folder mechanism and vertically reciprocating cutter mechanism, said cutter mechanism serving to sever the projecting portion of the labeling material from the remainder thereof, means to actuate said cutter mechanism and said folder mechanism so as to bring the latter into folding relation to said upstanding fold immediately after action of said cutter mechanism upon said labeling material, said actuating means also serving to cause said folder mechanism to fold the severed piece of labeling material downwardly at opposite sides of the folder gauge and of said upstanding fold to form a loop with a loop-hole through which said folder gauge extends, means embodied in the construction of said folder mechanism to cause the labeling material so folded to be secured to said upstanding fold, and means to strip said loop from said folder gauge under movement of said bag or package in the direction of the length of said folder gauge.

20. A machine of the kind described, a frame supporting a strip of labeling material, means to feed a predetermined portion at the end of the strip out of said frame, a folder gauge spaced one-half the distance of the projecting portion of said labeling material from said frame and on which said projecting portion rests medially between its length, said folder gauge being adapted to have a bag moved thereunder and said bag having an upstanding fold formed by folding the walls of the bag to close the latter, the upper edge of said upstanding fold being directly beneath said folder gauge and in close relation thereto, vertically reciprocating folder mechanism, vertically reciprocating cutter mechanism serving to sever the projecting portion of the labeling material from the remainder thereof, actuating mechanism for reciprocating said folder and cutter mechanisms in unison through a portion of their cycle of movement, stop means to limit the downward movement of said cutter mechanism during the latter portion of the downward movement of said folder mechanism, resilient means between said folder mechanism and said cutter mechanism to permit movement of said folder mechanism independently from said cutter mechanism after the latter is stopped in its downward movement, means to cause said folder mechanism to fold the projecting piece of labeling material over said folder gauge and against opposite sides of said upstanding fold after the downward movement of said cutter mechanism is stopped to form a loop through which said folder gauge extends, said folder mechanism including means in its construction to cause the labeling material at opposite sides of said fold to be fastened to the latter, and means to move said bag or package in the direction of the length of said folder gauge to disengage said bag or package from the latter.

21. In a machine of the kind described, flexible labeling material self-sealing under the application of heat and having openings spaced apart equi-distantly medially between its longitudinal edges and having also weakened lines extending from longitudinal edge to longitudinal edge centrally between adjacent openings, a frame supporting said labeling material and having a gauge bar, and means to feed said labeling material a predetermined distance beyond said gauge bar equaling the distance center to center of said openings, means for cutting the projecting portion of said labeling material at said gauge bar through the center of one of said openings, and means to fold the severed portion of said labeling material along its weakened lines and over said gauge bar, said last-mentioned means including two reciprocating folder members and a heating coil in one of said members, said members being brought in contact with each other at the end of its movement in one direction to conduct heat from the heated member to the unheated member and being moved toward each other when both members are heated and disposed at opposite sides of an upstanding fold of a closed bag to cause the folded labeling material to adhere thereto.

22. In a device of the kind described, a suitable frame, a vertical guide on said frame, a slide member reciprocable within said guide, a horizontally-disposed folder gauge, means to support flexible labeling material in said frame, means to cause a predetermined length at one end of said strip of flexible labeling material to be projected intermittently out of said frame, said labeling material possessing the quality of adherence to objects under the application of heat thereto, heated folder elements at the lower end of said slide member movable toward and from each other under swinging movement at different regions in their cycle of movement, means to sever the projecting end portion of said labeling material from the remainder thereof so that an unattached predetermined length of said labeling material is medially supported by said folder gauge, means for swinging said folder elements so that the folder members are separated when moving downwardly in contact with the supported piece of paper and on their further downward movement cause said piece of paper to be pressed against opposite sides of an upstanding fold on a filled bag or package placed beneath said folder gauge to form a loop extending over said folder gauge and straddling the sides of said upstanding fold, and means for causing the loop of the bag or package so labeled to be stripped from said folder gauge.

23. In a device of the kind described, a suitable frame having a vertically disposed cam bar secured thereto, said cam bar being widened at its upper and lower ends to form a narrow intermediate portion having its edges merging into the edges of the widened end portions thereof, means to deliver a filled bag or package provided with an upstanding fold beneath said frame, a vertically reciprocating slide member suitably guided in said frame and having a folder head secured to its lower end, spaced apart shafts journaled in said folder head, a horizontally disposed folder gauge over which a piece of flexible labeling material possessing the quality of adherence to other objects under the application of heat thereto, folder members secured to said shafts, trip arms also secured to said shafts and having engaging portions traveling in contact with opposite edges of said cam bar to cause said folder members to move toward and from each other while reciprocating with said slide member, at least one of said folder members having a heating coil located therein to heat the same, said trip arms causing said folder members to swing away from each other while the engaging portions of said trip arms ride in contact with the narrowed portion of said cam bar and to swing towards and contact each other when said engaging portions ride in contact with the widened portion at the upper end of said cam bar so as to heat the unheated folder member by conduction and to cause said engaging portions to approach each other when in contact with the widened portion at the lower end of said cam bar to bring the labeling material against and secure the same to the sides of an upstanding fold on a filled bag or package placed beneath said folder gage.

24. A device for applying labels to the upstanding folds of filled bags or packages, comprising a suitable frame, means to pass a strip of flexible labeling material possessing the quality of adherence to objects under the application of heat thereto through said frame, said means serving to project an end portion of the strip of labeling material over a fixed part of said frame serving as a cutter gauge, a folder gauge in the form of a spindle parallel with said cutter gauge and spaced therefrom over which the projected portion of said labeling material is directed and which projected portion is adapted to be folded loosely downwardly over opposite sides of said spindle for attachment to the upstanding fold or flange of a bag or package positioned beneath said spindle, vertically reciprocating folder means provided with heating means, said folder means folding said labeling material against opposite sides of said fold with a sliding contact between said material and said spindle, a cutter bar to sever the projecting portion of said strip of labeling material from the remainder of said strip, actuating means to cause vertical reciprocating movement of said folder means and said cutter bar in unison along the major portion of their reciprocating movement and to allow independent movement of said folder means as it travels through the lowermost portion of its cycle of movement, and means to move the labeled bag or package in the direction of the length of said spindle to strip the labeling material from the latter.

25. In a device of the kind described, a suitable frame having means for feeding a strip of labeling-material therefrom so that a predetermined portion at the end of the strip is projected from said frame, crimping mechanism carried by said frame through which the labeling-material is passed preparatory to projecting a portion thereof from said frame, a slender folder gauge over which the projecting crimped portion of the labeling material is directed and on which it rests, means for cutting off the projecting portion of said labeling material, and label-applying mechanism coacting with said folder gauge to force the severed portion of the labeling-material downwardly at opposite sides of said folder gauge so as to provide space between the latter and an upstanding portion of a filled bag positioned beneath said folder gauge and inwardly against opposite sides of said upstanding portion for sealing said labeling material to the latter.

References Cited in the file of this patent

UNITED STATES PATENTS

| Number | Name | Date |
| --- | --- | --- |
| 1,289,237 | Onderdonk | Dec. 31, 1918 |
| 2,191,535 | McNeill | Feb. 27, 1940 |
| 2,244,796 | Ogden | June 10, 1941 |
| 2,280,730 | Talbot | Apr. 21, 1942 |
| 2,293,687 | Allen | Aug. 18, 1942 |
| 2,329,669 | Tuthill | Sept. 14, 1943 |
| 2,417,817 | Finn | Mar. 25, 1947 |
| 2,538,520 | Holt et al. | Jan. 16, 1951 |
| 2,543,323 | Marsh | Feb. 27, 1951 |